US005112165A

United States Patent [19]

Hedlund et al.

[11] Patent Number: 5,112,165

[45] Date of Patent: May 12, 1992

[54] TOOL FOR CUTTING SOLID MATERIAL

[75] Inventors: Jan-Gunnar Hedlund, Sandviken; Bengt A. Asberg, Gävle, both of Sweden

[73] Assignee: Sandvik AB, Sandviken, Sweden

[21] Appl. No.: 512,402

[22] Filed: Apr. 23, 1990

[30] Foreign Application Priority Data

Apr. 24, 1989 [SE] Sweden ................................ 8901481

[51] Int. Cl.[5] ............................................. B23P 15/28

[52] U.S. Cl. ....................................... 407/118; 407/66

[58] Field of Search .................. 407/118, 66, 101, 102

[56] References Cited

U.S. PATENT DOCUMENTS 2,124,438 7/1938 Struk et al. ......................... 407/118

3,254,392 6/1966 Novkov ............................. 407/118

4,850,255 7/1989 Pruvot et al. ....................... 407/101

FOREIGN PATENT DOCUMENTS 0114025 6/1940 United Kingdom ................ 407/118

*Primary Examiner*—Bruce M. Kisliuk

*Assistant Examiner*—Lawrence Cruz

*Attorney, Agent, or Firm*—Burns, Doane, Swecker & Mathis

[57] ABSTRACT

A tool for cutting solid material includes a tool body having a recess, and a cutting insert received in the recess. The cutting insert has spacing buttons which engage a surface of the recess to create a space for accommodating a brazing material which secures the insert to the tool body. The surface of the recess includes an annular retaining groove which receives the buttons in order to prevent tilting of the insert prior to brazing.

14 Claims, 2 Drawing Sheets

TOOL FOR CUTTING SOLID MATERIAL

BACKGROUND OF THE INVENTION

The present invention relates to a tool for cutting solid material, the tool comprising a tool body and a cutting insert of hard material, e.g., cemented carbide, which is secured to the tool body by brazing. The invention also relates to the tool body per se.

When such a tool is cutting a relatively hard, solid material, e.g., sandstone, the cutting insert will be subjected to very high forces which create a turning moment that is transferred to the brazed joint between the cutting insert and the tool body. Thus, it is very important that the brazed joint be manufactured with great care.

A frequent problem occurring when securing a cutter insert to a tool body by brazing involves a difficulty in retaining the cutting insert in a correct orientation relative to the tool body before the brazing alloy is inserted between the cutting insert and the tool body. This problem is illustrated in FIGS. 1 and 2 and is described in detail later herein.

SUMMARY OF THE INVENTION

The present invention involves a tool for cutting solid material. The tool comprises a tool body having a forwardly open recess, and a cutting insert having spacer projections. The cutting insert is received in the recess such that the spacer projections engage a surface of the recess to form a space between the insert and the tool body for receiving brazing material which secures the insert to the tool body. The tool body is provided with an indentation structure for receiving the spacer projections in order to retain the cutting insert in a predetermined radial and axial orientation relative to the tool body.

Preferably, the spacer projections comprise a plurality of buttons, and the indentation structure comprises an annular groove which receives the buttons.

Preferably, the annular groove includes a radially facing supporting surface and an axially facing supporting surface.

The invention is also directed to the tool body per se which includes retaining means for retaining the cutting insert in a predetermined radial and axial orientation relative to the tool body.

BRIEF DESCRIPTION OF THE DRAWINGS

The objects and advantages of the invention will become apparent from the following detailed description of a preferred embodiment thereof in connection with the accompanying drawings in which like numerals designate like elements, and in which.

DETAILED DESCRIPTION OF A PREFERRED EMBODIMENT OF THE INVENTION

Figure 1:
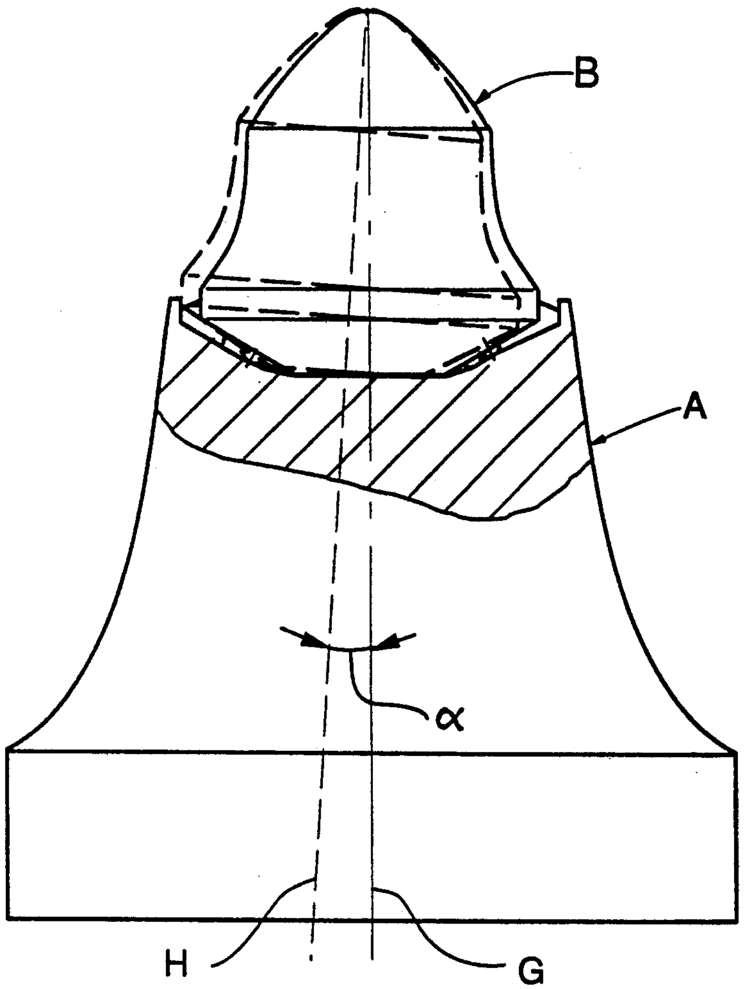
Fig.1 (PRIOR ART)
FIG. 1 depicts the front portion of a tool, partly broken away, according to the prior art.
Figure 2:
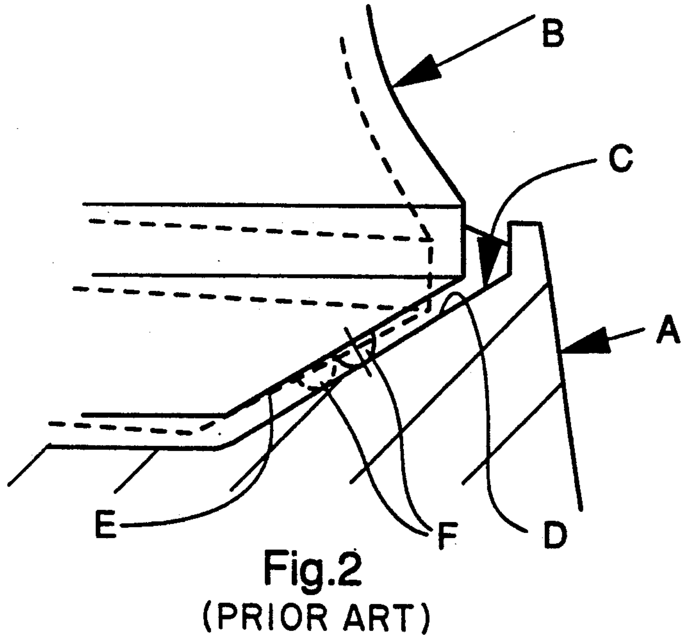
Fig.2 (PRIOR ART)
FIG. 2 depicts a detail in enlarged scale of the prior art tool according to FIG. 1.

The prior art tool according to FIGS. 1 and 2 includes a tool body A and a cutting insert B. The tool body A is provided with a recess C that is intended to receive the cutting insert B. The recess C includes a conical surface portion D.

The cutting insert B also includes a conical surface portion E that is provided with a number of spacer projections preferably in the form of buttons F, the buttons F being intended to cooperate with the conical surface portion D of the recess C.

As is shown in FIGS. 1 and 2, the cutting insert B is placed in the recess C such that the buttons contact the conical surface portion D. The position of the cutting insert B shown in full lines is the ideal one, i.e., wherein the cutting insert B and the tool body A have a common longitudinal center axis G, and the space for the brazing joint is of uniform volume. However, since the cutting insert is held to the tool body only by friction between the buttons F and the conical surface portion D, it will be appreciated that the cutting insert B can easily become tilted as shown in dotted lines in FIGS. 1 and 2. The degree of inclination of the cutting insert B is symbolized by the angle $\alpha$ included between the longitudinal center axis H of the cutting insert B and the longitudinal center axis G of the tool body.

The consequence of such a tilting of the cutting insert is that the thickness of the brazing joint will vary over the area of the brazing joint. This will adversely affect the ability of the brazing joint to absorb forces and turning moments during a cutting operation.

Figure 3:
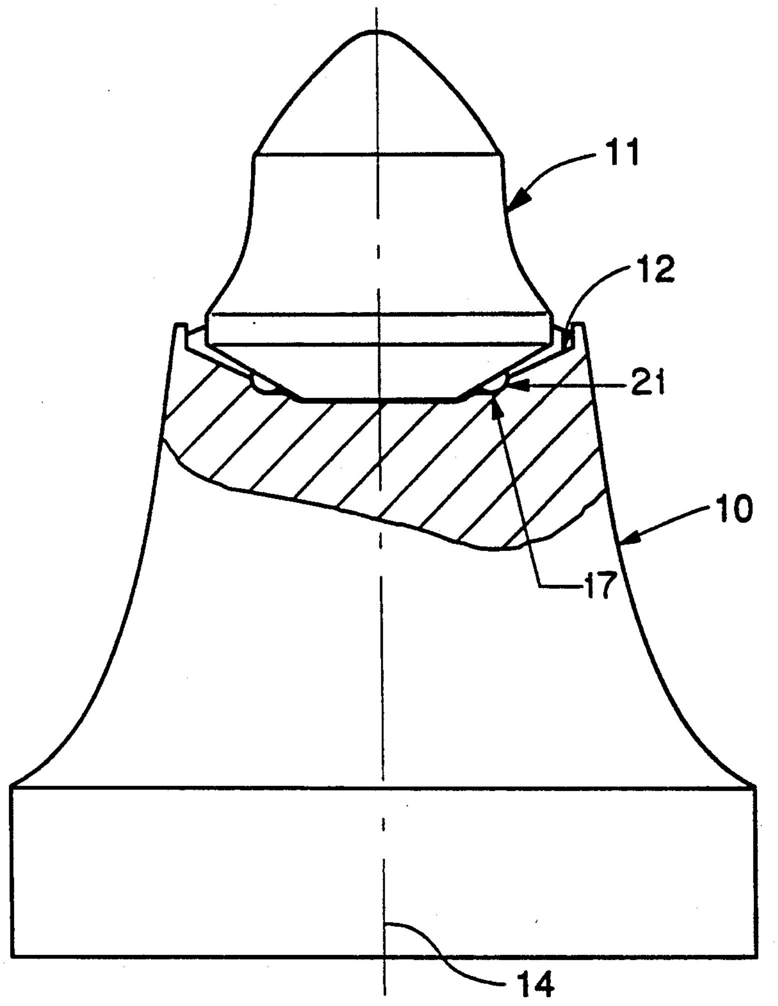
FIG. 3 depicts the front portion of a tool according to the present invention.

From FIG. 3 it can be seen that the tool according to the invention includes a tool body 10 and a cutting insert 11 of hard material, preferably cemented carbide. The described tool is intended to be mounted rotatably in a tool holder, that in turn is attached to an excavating machine. Due to this rotation about its own longitudinal axis, the tool is self-sharpening.

Figure 4:
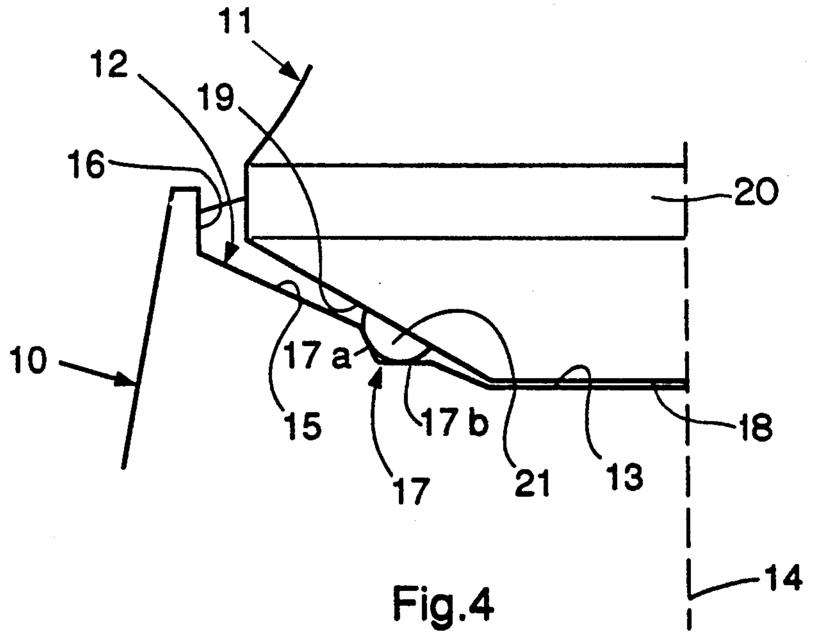
FIG. 4 depicts a detail in enlarged scale of the tool according to FIG. 3.

The tool body 10 includes a recess 12 (see also FIG. 4), adapted to receive the cutting insert 11. In the described embodiment the recess 12 has a flat bottom or rear portion 13 located in a plane perpendicular to the longitudinal center axis 14 of the tool. The recess also includes a conical surface portion 15 which tapers rearwardly from the front end of the tool body 10 to the bottom portion 13. The conical portion 15 is symmetrical with respect to the longitudinal center axis 14.

The recess 12 also includes an annular surface portion 16 defining an axis extending in the longitudinal direction of the tool and being symmetrical in respect of the longitudinal center axis 14 of the tool.

In the conical surface portion 15 an indentation preferably in the form of an annular retaining groove 17 is provided. The groove 17 includes a radially inwardly facing supporting surface 17*a* and an axially forwardly facing supporting surface 17*b*, the last-mentioned surface 17*b* preferably being disposed perpendicular to the longitudinal center axis 14. The radially inwardly facing supporting surface 17*a* and the axially forwardly facing supporting surface 17*b* define therebetween an angle preferably larger than 90°. The groove 17 is preferably located somewhat closer to the bottom or rear surface 13 of the recess 12 than to the top or front of the recess.

The cutting insert 11 according to the described embodiment has a flat bottom surface 18 adapted to be located above the bottom surface 13 of the recess in mounted position of the cutting insert 11.

The cutting insert 11 further includes a conical surface portion 19 which tapers rearwardly from a cylindrical periphery surface 20 of the cutting insert 11 to the bottom surface 1, that surface 20 defining the largest diameter of the cutting insert 11.

The conical surface portion 19 of the cutting insert is provided with a number of spacing buttons 21 that are adapted to be received in the retaining groove 17 in a mounted position of the cutting insert 11. In the disclosed embodiment the buttons 21 are semi-spherical. As is evident from FIG. 4, the buttons 21 are supported in the radial direction by the supporting surface 17*a* and in the axial direction by the supporting surface 17*b* when the buttons 21 are mounted in the groove 17. The buttons 21 and the groove 17 thus positively retain the cutting insert 11 in the proper predetermined radial and axial positions relative to the tool body before brazing takes place.

If for some reason the spacing buttons 21 were not positioned in the groove 17 after brazing has taken place, the cutting insert 11 would be tilted to such a high degree that the tool would be discarded at once in the quality control phase. That is, in accordance with the present invention it is not possible for the insert to be only slightly tilted.

In the described embodiment the brazed joint has a wedge-like cross-sectional shape when seen in a longitudinal cross section. However, brazed joints of other design are possible within the scope of the present invention.

Although the present invention has been described in connection with a preferred embodiment thereof, it will be appreciated by those skilled in the art that modifications, additions, substitutions, and deletions not specifically described may be made without departing from the spirit and scope of the invention as defined in the appended claims.

What is claimed is:

1. A tool for cutting solid material, comprising a tool body and a cutting insert mounted on said tool body, said tool body defining a front-to-rear extending longitudinal axis and having a forwardly facing surface, said cutting insert including a rearwardly facing surface opposing said forwardly facing surface, one of said surfaces defining an axially open recess receiving the other of said surfaces, said rearwardly facing surface including a first conical surface portion carrying rearwardly projecting spacer projection means arranged annularly about said axis, said forwardly facing surface including a second conical surface portion on which said insert is supported, said axis constituting a longitudinal axis of said second conical surface portion, said second conical surface portion carrying forwardly open indentation means arranged annularly about said axis and receiving said spacer projection means, said indentation means including supporting surface means engaged by said spacer projection means for retaining said cutting insert in a predetermined radial and axial orientation relative to said tool body and forming an axial space between said forwardly and rearwardly facing surfaces to receive a brazing material which secures said insert to said tool body.

2. A tool according to claim 1, wherein said indentation means comprises an annular groove which receives said spacer projection means.

3. A tool according to claim 2, wherein said spacer projection means comprises a plurality of annularly arranged buttons.

4. A tool according to claim 1, wherein said supporting surface means includes a radially facing supporting surface and an axially facing supporting surface.

5. A tool according to claim 4, wherein said radially facing supporting surface faces radially inwardly, and said axially facing supporting surface faces axially forwardly.

6. A tool according to claim 3, wherein said buttons are semi-spherical.

7. A tool according to claim 1, wherein said one of said surfaces includes a tapering section defining said recess, said other of said surfaces including a tapering section extending within said recess, said spacer projection means and said indentation means being carried by respective ones of said tapering sections.

8. A tool according to claim 7, wherein each of said tapering sections is of conical configuration.

9. A tool body forming a part of a tool for cutting solid materials, said tool body defining a front-to-rear extending longitudinal axis and having a forwardly facing surface to which a cutting insert is to be brazed, said surface including a forwardly open annular groove arranged coaxially about said axis and adapted to receive spacer projection means of the cutting insert for retaining the cutting insert in an axially spaced orientation relative to the tool body.

10. A tool body according to claim 9, wherein said forwardly facing surface forms a forwardly open recess, said annular groove disposed in said recess.

11. A tool body according to claim 9, wherein said surface includes a tapering section, said indentation means carried by said tapering section.

12. A tool body according to claim 11, wherein said tapering section is of conical configuration.

13. A tool body according to claim 9, wherein said annular groove includes a radially inwardly facing supporting surface and an axially forwardly facing supporting surface.

14. A tool according to claim 1, wherein said recess is formed in said forwardly facing surface.

* * * * *